US009654700B2

(12) United States Patent
Kovtun et al.

(10) Patent No.: US 9,654,700 B2
(45) Date of Patent: May 16, 2017

(54) COMPUTATIONAL CAMERA USING FUSION OF IMAGE SENSORS

(71) Applicant: Google Technology Holdings LLC, Mountain View, CA (US)

(72) Inventors: Ivan Kovtun, Cupertino, CA (US); Volodymyr Kysenko, Sunnyvale, CA (US); Yuriy Musatenko, Mountain View, CA (US); Adrian M Proca, Santa Cruz, CA (US); Philip S Stetson, Wexford, PA (US); Yevhen Ivannikov, Kiev (UA)

(73) Assignee: Google Technology Holdings LLC, Mountain View, CA (US)

( * ) Notice: Subject to any disclaimer, the term of this patent is extended or adjusted under 35 U.S.C. 154(b) by 44 days.

(21) Appl. No.: 14/487,785

(22) Filed: Sep. 16, 2014

(65) Prior Publication Data
US 2016/0080626 A1    Mar. 17, 2016

(51) Int. Cl.
*H04N 5/232* (2006.01)
*H04N 5/225* (2006.01)
(Continued)

(52) U.S. Cl.
CPC ......... *H04N 5/2355* (2013.01); *H04N 5/2258* (2013.01); *H04N 5/23232* (2013.01); *H04N 9/646* (2013.01)

(58) Field of Classification Search
CPC .... H04N 5/2355; H04N 9/646; H04N 5/2258; H04N 5/23232
See application file for complete search history.

(56) References Cited

U.S. PATENT DOCUMENTS

| 4,881,127 A | 11/1989 | Isoguchi et al. |
|---|---|---|
| 5,294,990 A | 3/1994 | Aoki et al. |

(Continued)

FOREIGN PATENT DOCUMENTS

| EP | 2043360 | 4/2009 |
|---|---|---|
| EP | 2645700 | 3/2012 |

(Continued)

OTHER PUBLICATIONS

"Advisory Action", U.S. Appl. No. 11/931,828, May 30, 2014, 3 pages.

(Continued)

*Primary Examiner* — Shahbaz Nazrul
(74) *Attorney, Agent, or Firm* — Wolfe-SBMC

(57) ABSTRACT

A camera device includes monochromatic and color image sensors that capture an image as a clear image in monochrome and as a Bayer image. The camera device implements image processing algorithms to produce an enhanced, high-resolution HDR color image. The Bayer image is demosaiced to generate an initial color image, and a disparity map is generated to establish correspondence between pixels of the initial color image and clear image. A mapped color image is generated to map the initial color image onto the clear image. A denoised clear image is applied as a guide image of a guided filter that filters the mapped color image to generate a filtered color image. The filtered color image and the denoised clear image are then fused to produce an enhanced, high-resolution HDR color image, and the disparity map and the mapped color image are updated based on the enhanced, high-resolution HDR color image.

20 Claims, 6 Drawing Sheets

(51) Int. Cl.
*H04N 9/64* (2006.01)
*H04N 5/235* (2006.01)

(56) References Cited

U.S. PATENT DOCUMENTS

| | | | |
|---|---|---|---|
| 5,505,199 | A | 4/1996 | Kim |
| 5,909,246 | A | 6/1999 | Terashima |
| 6,167,356 | A | 12/2000 | Squadron et al. |
| 6,347,925 | B1 | 2/2002 | Woodard et al. |
| 6,529,253 | B1 | 3/2003 | Matsute |
| 6,614,471 | B1* | 9/2003 | Ott .................. H04N 1/486 348/234 |
| 7,190,263 | B2 | 3/2007 | McKay et al. |
| 7,301,563 | B1 | 11/2007 | Kakinuma et al. |
| 7,414,665 | B2 | 8/2008 | Watanabe et al. |
| 7,450,187 | B2 | 11/2008 | Sun |
| 8,295,631 | B2 | 10/2012 | Adams, Jr. et al. |
| 8,619,128 | B2 | 12/2013 | Bilbrey et al. |
| 8,803,985 | B2 | 8/2014 | Kaizu et al. |
| 9,143,749 | B2 | 9/2015 | Wernersson |
| 2002/0080263 | A1 | 6/2002 | Krymski |
| 2003/0007088 | A1 | 1/2003 | Rantanen et al. |
| 2003/0052989 | A1 | 3/2003 | Bean et al. |
| 2004/0107103 | A1 | 6/2004 | Iyengar et al. |
| 2005/0154318 | A1 | 7/2005 | Sato et al. |
| 2005/0206820 | A1 | 9/2005 | Palmer |
| 2006/0156374 | A1 | 7/2006 | Hu et al. |
| 2007/0090283 | A1 | 4/2007 | Linke et al. |
| 2007/0115459 | A1 | 5/2007 | Nakao et al. |
| 2007/0201815 | A1 | 8/2007 | Griffin |
| 2007/0237423 | A1 | 10/2007 | Tico et al. |
| 2008/0077020 | A1 | 3/2008 | Young et al. |
| 2009/0086074 | A1 | 4/2009 | Li et al. |
| 2009/0087099 | A1 | 4/2009 | Nakamura |
| 2009/0109309 | A1 | 4/2009 | He et al. |
| 2009/0189992 | A1 | 7/2009 | Zhang et al. |
| 2009/0190803 | A1 | 7/2009 | Neghina et al. |
| 2010/0091119 | A1 | 4/2010 | Lee |
| 2010/0097491 | A1* | 4/2010 | Farina .................. H04N 9/045 348/223.1 |
| 2010/0149393 | A1 | 6/2010 | Zarnowski et al. |
| 2010/0208082 | A1 | 8/2010 | Buchner et al. |
| 2010/0271469 | A1 | 10/2010 | She |
| 2010/0309333 | A1 | 12/2010 | Smith et al. |
| 2010/0309334 | A1 | 12/2010 | James et al. |
| 2010/0309335 | A1 | 12/2010 | Brunner et al. |
| 2011/0013807 | A1 | 1/2011 | Lee et al. |
| 2011/0043691 | A1 | 2/2011 | Guitteny et al. |
| 2011/0052136 | A1 | 3/2011 | Homan et al. |
| 2011/0069189 | A1 | 3/2011 | Venkataraman et al. |
| 2011/0122315 | A1 | 5/2011 | Schweiger et al. |
| 2011/0205433 | A1 | 8/2011 | Altmann et al. |
| 2012/0081579 | A1 | 4/2012 | Doepke |
| 2012/0105584 | A1 | 5/2012 | Gallagher et al. |
| 2012/0314901 | A1 | 12/2012 | Hanson et al. |
| 2013/0016251 | A1* | 1/2013 | Ogasahara ............. H04N 9/09 348/238 |
| 2013/0057713 | A1 | 3/2013 | Khawand |
| 2013/0208138 | A1 | 8/2013 | Li et al. |
| 2013/0208143 | A1 | 8/2013 | Chou et al. |
| 2013/0271602 | A1 | 10/2013 | Bentley et al. |
| 2013/0314511 | A1 | 11/2013 | Chen et al. |
| 2014/0009634 | A1* | 1/2014 | Hiwada .................. H04N 5/225 348/222.1 |
| 2014/0063300 | A1 | 3/2014 | Lin et al. |
| 2014/0074265 | A1 | 3/2014 | Arginsky et al. |
| 2014/0085495 | A1 | 3/2014 | Almalki et al. |
| 2014/0160326 | A1* | 6/2014 | Black .................... H04N 9/045 348/262 |
| 2014/0232929 | A1 | 8/2014 | Ichikawa |
| 2014/0244617 | A1 | 8/2014 | Rose |
| 2014/0358473 | A1 | 12/2014 | Goel et al. |
| 2015/0195482 | A1 | 7/2015 | Wise |
| 2015/0271405 | A1 | 9/2015 | Lameer et al. |
| 2015/0288869 | A1 | 10/2015 | Furuhashi |
| 2015/0341546 | A1 | 11/2015 | Petrescu et al. |
| 2015/0341547 | A1 | 11/2015 | Petrescu et al. |
| 2015/0341548 | A1 | 11/2015 | Petrescu et al. |
| 2015/0341549 | A1 | 11/2015 | Petrescu et al. |
| 2015/0341550 | A1 | 11/2015 | Lay |
| 2015/0341561 | A1 | 11/2015 | Petrescu et al. |
| 2016/0037055 | A1 | 2/2016 | Waddington |
| 2016/0050354 | A1 | 2/2016 | Musatenko et al. |

FOREIGN PATENT DOCUMENTS

| | | |
|---|---|---|
| EP | 2852147 | 3/2015 |
| KR | 20070005947 | 1/2007 |
| WO | WO-2005099251 | 10/2005 |
| WO | WO-2007128114 | 11/2007 |
| WO | WO-2010068175 | 6/2010 |
| WO | WO-2012166044 | 12/2012 |
| WO | WO-2013172335 | 11/2013 |

OTHER PUBLICATIONS

"Final Office Action", U.S. Appl. No. 11/931,828, Jan. 14, 2014, 14 pages.
"Final Office Action", U.S. Appl. No. 11/931,828, May 13, 2010, 17 pages.
"Final Office Action", U.S. Appl. No. 11/931,828, Jun. 11, 2015, 16 pages.
"Final Office Action", U.S. Appl. No. 13/468,098, Sep. 18, 2015, 16 pages.
"International Preliminary Report on Patentability", Application No. PCT/US2013/040347, Nov. 20, 2014, 6 pages.
"International Search Report and Written Opinion", Application No. PCT/US2015/018869, May 20, 2015, 10 pages.
"International Search Report and Written Opinion", Application No. PCT/US2013/040437, Jul. 23, 2013, 9 pages.
"International Search Report and Written Opinion", Application No. PCT/US2015/023238, Jun. 22, 2015, 11 pages.
"International Search Report and Written Opinion", Application No. PCT/US2015/023250, Jun. 22, 2015, 12 pages.
"International Search Report and Written Opinion", Application No. PCT/US2015/023241, Jun. 23, 2015, 12 pages.
"New Blink Apps Even More Creative", Retrieved from: http://research.microsoft.com/en-us/news/features/blink-061813.aspx, Jun. 18, 2013, 4 pages.
"Non-Final Office Action", U.S. Appl. No. 11/931,828, Jul. 12, 2013, 21 pages.
"Non-Final Office Action", U.S. Appl. No. 11/931,828, Oct. 7, 2015, 22 pages.
"Non-Final Office Action", U.S. Appl. No. 11/931,828, Nov. 19, 2014, 20 pages.
"Non-Final Office Action", U.S. Appl. No. 11/931,828, Dec. 30, 2009, 14 pages.
"Non-Final Office Action", U.S. Appl. No. 13/468,098, Mar. 2, 2015, 14 pages.
"Non-Final Office Action", U.S. Appl. No. 14/218,194, Sep. 11, 2015, 7 pages.
"Non-Final Office Action", U.S. Appl. No. 14/448,199, Sep. 17, 2015, 14 pages.
"Non-Final Office Action", U.S. Appl. No. 14/450,573, Dec. 23, 2015, 10 pages.
"Non-Final Office Action", U.S. Appl. No. 14/457,374, Nov. 13, 2015, 12 pages.
"Powershot SX700HS Camera User Guide", Retrieved from the Internet: http://gdlp01.c-wss.com/gds/7/0300014407/02/PowerShot_SX700HS_Camer_User_Guide_EN.pdf, Mar. 29, 2014, 196 pages.
"Restriction Requirement", U.S. Appl. No. 14/450,390, Dec. 16, 2015, 6 pages.
"Restriction Requirement", U.S. Appl. No. 14/450,522, Dec. 24, 2015, 6 pages.
"Restriction Requirement", U.S. Appl. No. 14/450,553, Jan. 7, 2016, 6 pages.

(56) References Cited

OTHER PUBLICATIONS

"Restriction Requirement", U.S. Appl. No. 14/450,573, Sep. 1, 2015, 6 pages.
Dexter,"Multi-view Synchronization of Human Actions and Dynamic Scenes", In Proceedings British Machine Vision Conference, 2009, 11 pages.
Whitehead,"Temporal Synchronization of Video Sequences in Theory and in Practice", Proceedings of the IEEE Workshop on Motion Video Computing, 2005, 6 pages.
"Non-Final Office Action", U.S. Appl. No. 14/450,390, Apr. 8, 2016, 10 pages.
"Notice of Allowance", U.S. Appl. No. 13/468,098, Mar. 23, 2016, 8 pages.
"Notice of Allowance", U.S. Appl. No. 14/218,194, Feb. 26, 2016, 5 pages.
"Notice of Allowance", U.S. Appl. No. 14/448,199, Apr. 5, 2016, 10 pages.
"Notice of Allowance", U.S. Appl. No. 14/457,374, Feb. 10, 2016, 15 pages.
"Restriction Requirement", U.S. Appl. No. 14/450,461, Jan. 20, 2016, 6 pages.

* cited by examiner

COMPUTATIONAL CAMERA USING FUSION OF IMAGE SENSORS

BACKGROUND

Portable electronic devices, such as mobile phones, tablet computers, multimedia devices, and the like often include multimedia capabilities that enable a user to capture images (e.g., digital photos), record video, and/or communicate using communication features of a device. To implement these multimedia capabilities, the portable devices are implemented with a camera device that can be used to capture the images, which are then processed and saved as digital photos. Often, the quality of the captured and saved digital photos is dependent on the image processing features of the camera device, and users typically want the highest-resolution quality images for viewing and sharing. Some camera devices that are implemented as a digital camera or as a component of a portable device, such as a mobile phone, are designed for high dynamic range (HDR) imaging to capture digital photos having a greater dynamic range. This can be accomplished by capturing different exposures of the same subject matter at different exposure levels, and then combining the different exposures to generate a digital photo.

BRIEF DESCRIPTION OF THE DRAWINGS

Embodiments of a computational camera using fusion of image sensors are described with reference to the following Figures. The same numbers may be used throughout to reference like features and components that are shown in the Figures.

DETAILED DESCRIPTION

Figure 1:
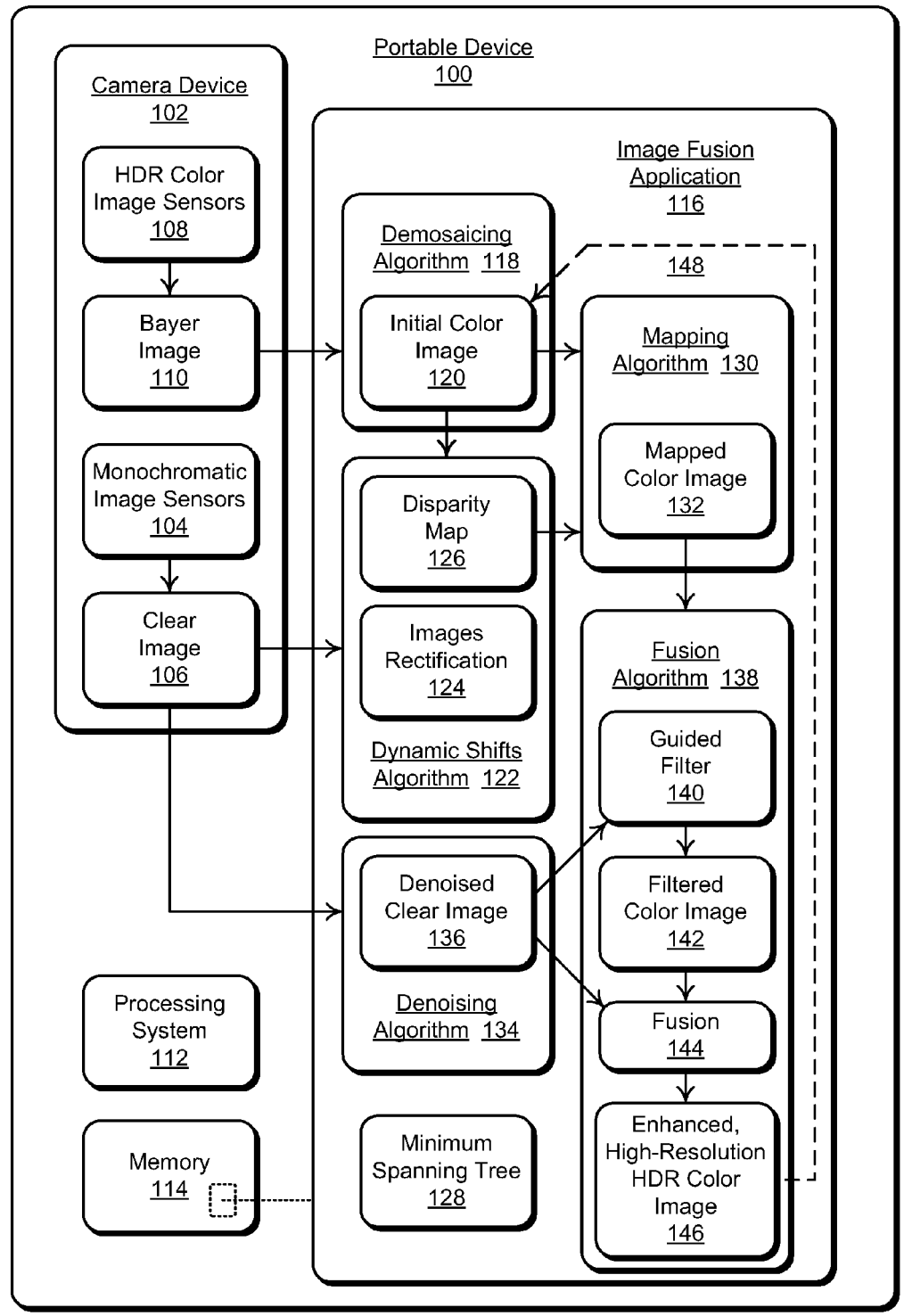
FIG. 1 illustrates an example portable device in which embodiments of a computational camera using fusion of image sensors can be implemented.

Embodiments of a computational camera using fusion of image sensors are described, such as for a camera device that includes monochromatic image sensors that capture the light of an image as a clear image in monochrome, and includes HDR color image sensors that capture the light of the image as a Bayer image. For example, a camera device that is implemented as a digital camera or as a component of a portable device, such as a mobile phone, can be designed for high dynamic range (HDR) imaging to capture digital photos with both monochromatic image sensors and HDR color image sensors. The camera device also implements image processing algorithms of an image fusion application to produce an enhanced, high-resolution HDR color image that has a high signal-to-noise ratio based on the clear image. The image enhancements to generate the enhanced, high-resolution HDR color image are achieved with reduced computational complexity over conventional techniques.

In the described techniques, a demosaicing algorithm of the image fusion application is implemented to demosaic the Bayer image and generate an initial color image in linear RGB space. A dynamic shifts algorithm (also referred to as a stereo correspondence algorithm) then generates a disparity map to establish correspondence of image points produced by all of the sensors in the camera device. In a Bayer-Clear HDR array camera, correspondence between color image pixels of the initial color image and clear image pixels of the clear image are established. In implementations having more sensors, this correspondence can be established more reliably.

In implementations, the dynamic shifts algorithm can generate a minimum spanning tree (MST) or pixels, which can be extended to a segmentation tree, where an image is first segmented and then the minimum spanning tree is built within every segment. The minimum spanning tree can be created for any particular image, and every node corresponds to the image pixels and every edge represents the difference between pixels intensity or RGB values (or some other metric). The MST is useful for fast calculations of distance between pixels in a sense of difference of their intensities. Minimum spanning tree models are created for the clear image and the initial color image, where nodes of the MST represent the pixels of the clear image and the color image. A clear image pixel node of the MST contains an intensity of the pixel, whereas a color image pixel node contains the color of the pixel with the three R, G, and B components.

The MST can be used to calculate stereo correspondence that produces a disparity map. Segmented trees provides for an increased quality of disparity map, and provides for a more precise depth estimation. The resulting correspondence and disparity map defines a mapping of the clear pixels of the monochromatic sensor image into the pixels of the color image or images produced from one or more Bayer sensors. In implementations, left and right disparities that are built on respective left or right MST trees can be used to find both reliable and unreliable regions for a better quality disparity map. Using the disparity map, mapping algorithm generates a mapped color image that is obtained by mapping of the initial color image onto the clear image. A denoising algorithm of the image fusion application generates a denoised clear image from the clear image, and the denoised clear image is applied as a guide image of a guided filter that filters the mapped color image to generate a filtered color image. Guided filter is a technique that allows filtering of one image using kernels built from information of another image.

A fusion algorithm of the image fusion application then fuses the filtered color image and the denoised clear image to produce the enhanced, high-resolution HDR color image. The fusion is a recombination of a reference channel (e.g., the clear image, also referred to as the clear channel) with non-reference channels (e.g., the initial color image or multiple color images from multiple sensors and/or additional monochromatic images) using the mapped color images and/or clear images that produces a higher quality color image from the multiple clear images and the multiple color images. In the simplest case, a single clear image and a single color image are used to produce the higher quality color image.

Stereo correspondence is typically computed in undistorted image space to remove lens distortion, and therefore, a simpler approach is to perform image fusion in the undistorted image space. However, in embodiments described herein, the image fusion application can then reiterate and perform image fusion in the initial distorted space of the image, thus preventing extra resampling steps that will avoid loss of related sharpness. When reiterating and returning to the undistorted image space, a MST of the clear image can be created in that space. Mapping of the color image is implemented to map the undistorted clear image pixels to the undistorted color image pixels, and even to non-demosaiced sensor pixels of the HDR color image sensors. With this mapping, an enhanced color demosaicing can be created using the clear image MST and mapping the Bayer sensor pixels to it, which assigns the R, G or B values to corresponding MST nodes.

Most of the tree nodes will have some values assigned, but some nodes may remain without any value. Then for every color channel of R, G, or B, a corresponding channel color in every node can be approximated using the MST. For example, if there are two nodes of the tree that have an R (red) value, and there are a few nodes between them without an R value, then the missing R values can be modeled as if R is a linear function of clear pixel intensity values in the nodes. The same process can be applied for the G (green) and B (blue) channels, and the process relies on a higher frequency sampling of the clear channel, which allows for a higher resolution color image to be restored than by using conventional debayering techniques. For areas of an image with occlusions or disparity jumps, the resulting gap in the image can be filled by color from the further (smaller disparity) plane. The result of demosaicing then can produce a higher quality color image that is already mapped to the clear channel, and that can be further used in a fusion process.

A recombination part of the image fusion process then utilizes a denoised clear image that can be generated with any one of various denoising algorithms, such as a Bilateral Filter, a Non Local Means (NLM) Filter, a Wavelet Denoising Filter, or others. Color images can also be denoised utilizing denoising filtering. Further, the color images can be filtered using a guided filter that utilizes a denoised clear channel as a guide. The guide can also account for a color difference using color images to prevent over-filtering of the edges between different colors that may happen to have similar luma values. A guided filter can be utilized more than once to provide a proper level of color noise suppression. The guided filter can be applied in the RGB color space, or it can be applied in the YUV color space, which can be beneficial because the aggressiveness of the filter on U and V can typically be higher and provide better color noise reduction. The described techniques for image fusion can also be extended to producing an image not only from the clear channel standpoint, but also from the Bayer channel standpoint, where clear data is mapped to the Bayer image and used for the guided filtering in areas where the mapping is reliable and consistent (e.g., does not have significant discontinuities).

When clear and color images are denoised as described above, they are fused using a linear recombination model (which may also use a second order model). The linear recombination can be done in the RGB or YUV color space, as described further below. As a result of the fusing process, a fused image is generated that is the enhanced, high-resolution HDR color image having a high signal-to-noise ratio derived from the denoised clear image. The noise level in the resulting enhanced, high-resolution HDR color image will be noticeably higher than the noise level in a typical color image obtained from a Bayer sensor because the noise level of the clear image is higher due to the lack of color filters.

While features and concepts of a computational camera using fusion of image sensors can be implemented in any number of different devices, systems, and/or configurations, embodiments of a computational camera using fusion of image sensors are described in the context of the following example devices, systems, and methods.

FIG. 1 illustrates an example portable device 100 in which embodiments of a computational camera using fusion of image sensors can be implemented. The portable device 100 may be any type of portable electronic and/or computing device, such as a mobile phone, tablet computer, communication, entertainment, handheld navigation, portable gaming, media playback, and/or any other type of electronic and/or computing device. The portable device 100 includes a camera device 102, such as an array camera that performs computations to implement the fusion of image sensors. An array camera is designed for high dynamic range (HDR) imaging and includes at least one monochromatic (clear) channel and at least one Bayer (color) channel providing color output. In implementations, the portable device 100 may be implemented as the camera device itself. In this example, the camera device 102 is implemented with one or more monochromatic image sensors 104 that capture the light of an image as a clear image 106 in monochrome. The camera device 102 also includes one or more HDR color image sensors 108 that capture the light of the image as a Bayer image 110 in red, green, and blue (RGB) color with a Bayer color filter array. Each pixel of the Bayer image is only one of red, green, or blue as captured by the Bayer pattern of the color filter array.

The example portable device 100 can include a wired and/or battery power source to power device components, such as a processing system 112. The portable device 100 can include memory 114, as well as any number and combination of components as further described with reference to the example device shown in FIG. 6. The portable device 100 includes an image fusion application 116 that can be implemented as a software application or module (e.g., executable instructions) stored on computer-readable storage memory, such as any suitable memory device or electronic data storage (e.g., the memory 114). The portable device 100 can be implemented with computer-readable storage memory as described with reference to the example device shown in FIG. 6. In implementations, the image fusion application 116 includes image processing algorithms that implement the techniques for image fusion described herein.

The image fusion application 116 includes a demosaicing algorithm 118 to demosaic the Bayer image 110 and generate an initial color image 120. The pixels of the initial color image 120 are generated to have all of the RGB colors from the pixels of the Bayer image 110 that are each only one of the red, green, or blue color. As shown in the example, the demosaicing algorithm 118 receives an input of the Bayer image 110 and generates an output as the initial color image 120. A traditional demosaicing technique can be implemented to reconstruct a full color image (e.g., the initial color image 120) from incomplete color samples that are output from an image sensor, such as described by Keigo Hirakawa et al. in "Adaptive Homogeneity-Directed Demosaicing Algorithm"(AHID algorithm) (IEEE Transactions on Image Processing Vol: 14, Issue:3, Mar. 2005). The demosaicing algorithm 118 may also be implemented for adaptive homogenous interpolation demosaicing (AHID) or extensions thereof for HDR modes, or may utilize a linear interpolation technique.

The image fusion application 116 includes a dynamic shifts algorithm 122 that is implemented for images rectification 124 and to generate a disparity map 126. The images rectification 124 can be based on a model of the camera lens that is used to capture the images, and is implemented for pixel correction to undistort the clear image 106 and the initial color image 120. The dynamic shifts algorithm 122 generates the disparity map 126, which establishes correspondence between color image pixels of the initial color image and clear image pixels of the clear image. As shown in the example, the dynamic shifts algorithm 122 receives inputs of the clear image 106 and the initial color image 120, and then generates an output as the disparity map 126.

The dynamic shifts algorithm 122 can also generate a minimum spanning tree (MST) 128 or pixels, which can be extended to a segmentation tree, where an image is first segmented and then the minimum spanning tree is built within every segment. The minimum spanning tree can be created for any particular image, and every node corresponds to the image pixels and every edge represents the difference between pixels intensity or RGB values (or some other metric). The MST is useful for fast calculations of distance between pixels in a sense of difference of their intensities. Minimum spanning tree models are created for the clear image 106 and the initial color image 120, where nodes of the MST represent the pixels of the clear image and the color image. In the minimum spanning tree 128, every node represents the color intensity of a pixel or a set of pixels, and the edges between nodes represent the difference between node intensities. A clear image pixel node of the MST contains an intensity of the pixel, whereas a color image pixel node contains the color of the pixel with the three R, G, and B components. In implementations, the minimum spanning tree 128 can be created using different techniques. Use of a minimum spanning tree for stereo correspondence matching is a known technique as described by Q. Yang, A Non-Local Cost Aggregation Method for Stereo Matching" (IEEE Conference on Computer Vision and Pattern Recognition (CVPR) 2012, 1402-1409).

The dynamic shifts algorithm 122 can then calculate the disparity map 126 based on the minimum spanning tree 128 that maps color image pixels of the initial color image 120 to clear image pixels of the clear image 106. An example of an algorithm to generate a disparity map is described by Q. Yang, A Non-Local Cost Aggregation Method for Stereo Matching" (IEEE Conference on Computer Vision and Pattern Recognition (CVPR) 2012, 1402-1409). In implementations, the disparity map 126 (also referred to as a depth map) may also be calculated by different techniques, such as using the technique described by Xing Mei et al. in "Segment-Tree based Cost Aggregation for Stereo Matching" (CVPR2013). In implementations, the mapping is calculated using clear channel (e.g., the clear image) and a luma component from the initial color image, calculated using a simple or traditional version of debayer. This calculation can also use segmentation and the minimum spanning tree. Additionally, use of a penalty function can be census, or census in combination with sum of absolute difference.

The image fusion application 116 also includes a mapping algorithm 130 that is implemented to generate a mapped color image 132 based on the disparity map 126 to map the initial color image 120 onto the clear image 106. As shown in the example, the mapping algorithm 130 receives inputs of the initial color image 120 and the disparity map 126, and generates an output as the mapped color image 132. The signal-to-noise ratio (SNR) is higher in the clear image 106, having better sharpness (e.g., better sampling than in the color image), and the disparity map 126 is used to map the initial color image onto the clear image. In implementations, the mapped color image 132 may be mapped as a red, green, blue (RGB) color image from which a filtered color image is generated and used to produce an enhanced, high-resolution HDR color image. Alternatively, the mapped color image 132 may be mapped as a luma and chrominance (YUV) components image from which the filtered color image is generated and used to produce the enhanced, high-resolution HDR color image.

The image fusion application 116 includes a denoising algorithm 134 that is implemented to denoise the clear image 106 and generate a denoised clear image 136. As shown in the example, the denoising algorithm 134 receives an input of the clear image 106 and then generates an output as the denoised clear image 136. The image fusion application 116 also includes a fusion algorithm 138 that is implemented to apply the denoised clear image 136 as a guide image of a guided filter 140 that filters the mapped color image 132 to generate a filtered color image 142. As shown in the example, the fusion algorithm 138 receives inputs of the mapped color image 132 and the denoised clear image 136, and then generates an output as the filtered color image 142 utilizing the guided filter 140. The denoised clear image 136 is used as the guide image to construct the guided filter 140, which can then be applied to the RGB color space, or the YUV space of the mapped color image 132, to generate the filtered color image 142. Guided filter is a technique that allows filtering of one image using kernels built from information of another image, and is described by K. He et al. in "Guided Image Filtering" (European Conference on Computer Vision (ECCV), 2010, pp. 1-14).

The fusion algorithm 138 implements fusion 144 (also referred to as recombination) to combine the filtered color image 142 and the denoised clear image 136 to produce an enhanced, high-resolution HDR color image 146. This technique preserves the high resolution of the clear image 106 (e.g., via the denoised clear image 136 which has a high signal-to-noise ratio) and preserves the color from the initial color image 120 (e.g., via the mapped color image 132). The image fusion application 116 is implemented to then reiterate at 148 in the undistorted image space and produce a higher quality debayered image using the MST based technique and using a clear image MST and Bayer pattern. This then produces the higher quality color image that allows to further (optionally) update the disparity map 126 and the mapped color image 132 based on the enhanced, high-resolution HDR color image 146 to map the enhanced, high-resolution HDR color image onto the clear image. The image fusion application may update the minimum spanning tree 128 that models color sampling of the initial color image 120 to regenerate disparity map 126 and improve the color sampling over the initial color image, if needed. The image fusion application 116 effectively utilizes the clear image 106 to debayer the Bayer image 110 based on the reiterated use of the enhanced, high-resolution HDR color image 146 that updates the disparity map 126 and the mapped color image 132.

The dynamic shifts algorithm 122 can reiterate several passes to improve the color sampling and disparity map 126 output. Initially, the demosaicing algorithm 118 approximates the initial color image 120 based on the red, green, or blue color value of each pixel in the Bayer image 110.

However, given the known minimum spanning tree 128 and the enhanced, high-resolution HDR color image 146, the initial color image 120 can be replaced and then used for mapping to generate the disparity map 126 and the mapped color image 132. Components and features of the image fusion application 116 are further shown and described with reference to FIG. 2.

For nodes of the minimum spanning tree 128 having less than the three RGB colors, neighboring nodes are looked to in the minimum spanning tree, and the colors can be interpolated between the nodes. The image fusion application 116 is implemented to leverage the distance between the nodes of the tree, such as to determine a node having the shortest distance on the tree and that has lacking color. The image fusion application can determine a few of these nodes, and then utilize various techniques to interpolate the color into the pixels that are lacking a given color. One such technique that may be implemented is a linear combination with weights equal to a distance from the node to neighboring nodes with known color.

For example, if the red (R) color pixel is missing in the current node, the image fusion application 116 can traverse up the minimum spanning tree 128 to find a node that has an R pixel present, and also back down the tree to find another node that has the R pixel. The image fusion application can then interpolate the R color in the node that is missing the R color with unknown R by averaging the R color from the up and down neighboring nodes using the distance on the edges as a weight. This approach can be applied for all RGB channels, and to provide the pixel colors for all of the minimum spanning tree nodes in all three of the R, G, and B components. This results in a segmented tree-based Debayer mapped to clear channel, providing an image with known RGB values assigned to every pixel of the clear image.

As described, the image fusion application 116 generates the coloring of the minimum spanning tree nodes and the clear channel pixel values are determined, from which the image fusion application can implement the fusion algorithm 138 to recombine the clear and colors in RGB space or in YUV space. Additionally, if multiple bayer channels are implemented, then more of the color pixels in the same node (coming from different Bayer sensors) can be evaluated, and the values of RGB from the different sensors averaged over the pixels in a node for a more precise color value within the node.

Additionally, averaging the color pixel values over a node can be performed even when a single Bayer array is utilized, which can increase the signal-to-noise ratio (SNR) in larger flat areas or patches of an image. In an implementation, the clear channel and Bayer channel resolution are the same, where the Bayer channel has significantly less resolution than traditional Bayer. The advantage of this algorithm is that, in many cases, it will result in very sharp color output because the color boundaries in most cases can be derived by grouping pixels in the clear channel reflected by the segmentation tree. If the described algorithm does not take into account transitions of colors preserving the same luma, the image fusion application 116 can be implemented to detect the transitions and utilize the output of traditional Debayer in such areas, which can be performed on a traditionally debayered image. The resolution may be somewhat limited by the traditional debayer in such areas, however, occurrences of such boundaries are not very frequent and in areas where luma has edges, the areas will have proper coloring with luma defined resolution.

The image fusion application 116 may also be implemented to perform other operations, such as lens shading, as well as undistortion for every channel prior to a disparities calculation. The disparities calculation utilizes stereo calibration prior, and uses calibration parameters from the calibration stage for the disparities calculation. The pixel mapping that is derived from the disparities calculation can be used in the undistorted or distorted (initial) image, such as to allow for a decrease in noise influence in the distorted image on the quality of the output picture.

Figure 2:
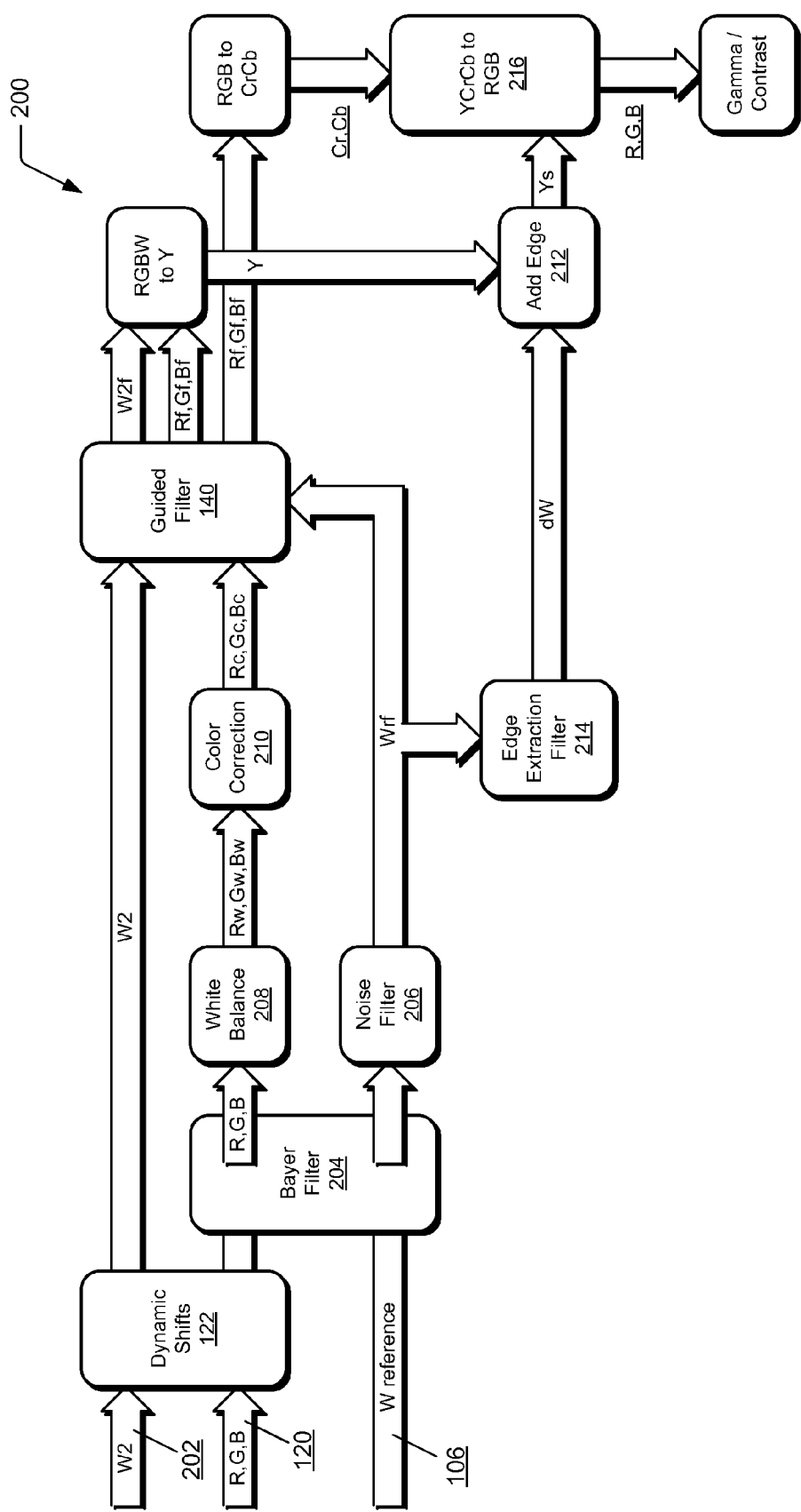
FIG. 2 illustrates an example image fusion application implemented by the portable device in embodiments of a computational camera using fusion of image sensors.

FIG. 2 illustrates an example 200 of the image fusion application 116 and the image processing algorithms, as described with reference to FIG. 1, and that is implemented to fuse the filtered color image 142 (e.g., Bayer channel image) and the denoised clear image 136 (e.g., clear channel image). The image fusion application 116 receives the clear image 106 as the clear channel identified as the "W reference" (e.g., a white reference channel $W_i$), a luma component 202 identified as "W2" in the example, and the initial color image 120 identified as RGB in the illustrated example 200. The RGB input includes a red channel ($R_i$), a green channel ($G_i$), and a blue channel ($B_i$). Generally, a white channel color recombination processor combines the white channel with the RGB color channels, and the image fusion application 116 then outputs a red channel ($R_o$), a green channel ($G_o$), and a blue channel ($B_o$). In implementations, the color input channels are scaled so that they will match the W reference channel (e.g., the clear channel) in intensity. The scaler can be derived at the calibration stage and stored in the calibration data, and the scaling itself can be performed as a pixel multiplication operation.

The image fusion application 116 implements a joint demosaicing with a Bayer filter 204 after a dynamic shift using the luma component 202 and the RGB from the initial color image 120. The image fusion application 116 is also implemented to extract the color information from RGB utilizing an RGB to YCbCr linear transformation, where:

$$Cb = Kcb\_r * R_i + Kcb\_g * G_i + Kcb\_b * B_i;$$

$$Cr = Kcr\_r * R_i + Kcr\_g * G_i + Kcr\_b * B_i;$$

const float Kcb_r=−0.168736f;
const float Kcb_g=−0.331264f;
const float Kcb_b=0.5f;
const float Kcr_r=0.5f;
const float Kcr_g=−0.418688f;
const float Kcr_b=−0.081312f The luma channel is created by a linear combination of the input color channels $R_i$, $G_i$, and $B_i$, and the input clear channel W reference ($W_i$) to form a new Y channel (Yw), where Yw=(c00*Ri+c01*Gi+c02*Bi+c03*Wi). The [c00-c03] coefficients can be derived at the calibration stage and stored in the calibration data. The clear channel (e.g., clear image 106) identified as the "W reference" is input to the noise filter 206 for noise suppression (e.g., an example of the denoising algorithm 134). Other algorithms for noise suppression may also be implemented, such as non-local means (NLM), bilateral filtering, Gaussian filters, and the like. The image fusion application can also be implemented to perform a white balance 208 and a color correction 210 of the initial color image 120 (e.g., the RGB color inputs). The newly created Yw channel data can be enhanced by adding edge information at 212, where Yee=Yw+EEi. An edge extraction filter 214 is implemented to extract edges from the clear channel and boost the edges to define sharpness.

The image fusion application 116 implements the guided filter 140 that combines the luma component 202 identified as the "W2" input, the clear channel 106 identified as the "W reference" input, and the RGB color input of the initial color image 120. An implementation of the guided filter 140 is described by Kaiming He et al. in "Guided Image Filtering" (European Conference on Computer Vision (ECCV), 2010, pp. 1-14). The guided filter 140 forms a filtering kernel in every image locality, and a kernel calculation is based on one image as it is applied to another image. A bilateral filter may be implemented as a particular type of the guided filter when both images coincide. A conventional implementation uses an approximation of optimal kernel by several box filters, which allows for a fast implementation. The image fusion application 116 then converts back to the RGB color space at 216 from the Yw and Cr, Cb channels that are processed as described above. This is accomplished with:

$$Ro = Yw + Krc\_r * Cr;$$

$$Go = Y + Kg\_cb * Cb + Kg\_cr * Cr;$$

$$Bo = Y + Kb\_cb * Cb;$$

const float Kr_cr=1.402f;
const float Kg_cb=−0.34414f;
const float Kg_cr=−0.71414f;
const float Kb_cb=1.772f In embodiments, the image fusion application 116 can be implemented to perform the recombination in the YUV space, rather than RGB. The recombination algorithm calculates a recombined luma of the clear channel and the Bayer channel from the luma of the clear channel (W) and the UV components of the Bayer channels. The model fuses luma Yw as: Yw=p*U+s*V+q(u, v)*W, where q(u, v)=qw+qu*U+qv*V. This is a second order model with respect to UV that uses a scaled clear channel luma and Bayer UV for a high SNR output luma. For a full-color output, the recombination algorithm utilizes Yw and noise filtered UV components from the Bayer channel. Further, the Yw luma can be improved when using sharpness information EE as mentioned above for RGB recombination.

The image fusion application 116 can also be implement a calibration stage, where measurements for every type of light and measure of the RGB intensities over the patches of MacBeth chart data, and solve them for an over-determined system using LSF. The model parameters qw, qu, qv can be determined so that data points best fit the linear curve (plane), and the overall error is minimized. An error determined for the i-th measurement is Eri=qi(u, v)*Wi+p*Ui+s*Vi Ywi, where qi(u, v)=qw+qu*Ui+qv*Vi. The variables Ui and Vi are UV values determined from the Bayer channel; the Wi are values determined from the clear channel; and the Ywi is determined from the MacBeth chart patches definition.

This is a second order model. However, if qu=qv=0, then the model is of a first order similar to RGB. The Sum(Eri^2) is minimized, which drives the sum error to zero as much as possible. This can be solved by LSF, the same as for the RGB case. A runtime stage can use this equation for recombining Yw=q(u, v)*W+p*U+s*V. An advantage of implementing the recombination in the YUV space is that UV components are typically very low pass, which allows strong noise suppression without loss of useful information. This in particular allows for a decrease of the color noise.

Example methods 300 and 400 are described with reference to respective FIGS. 3 and 4 in accordance with implementations of a computational camera using fusion of image sensors. Generally, any of the services, components, modules, methods, and operations described herein can be implemented using software, firmware, hardware (e.g., fixed logic circuitry), manual processing, or any combination thereof. The example methods may be described in the general context of executable instructions stored on computer-readable storage media that is local and/or remote to a computer processing system, and implementations can include software applications, programs, functions, and the like.

Figure 3:
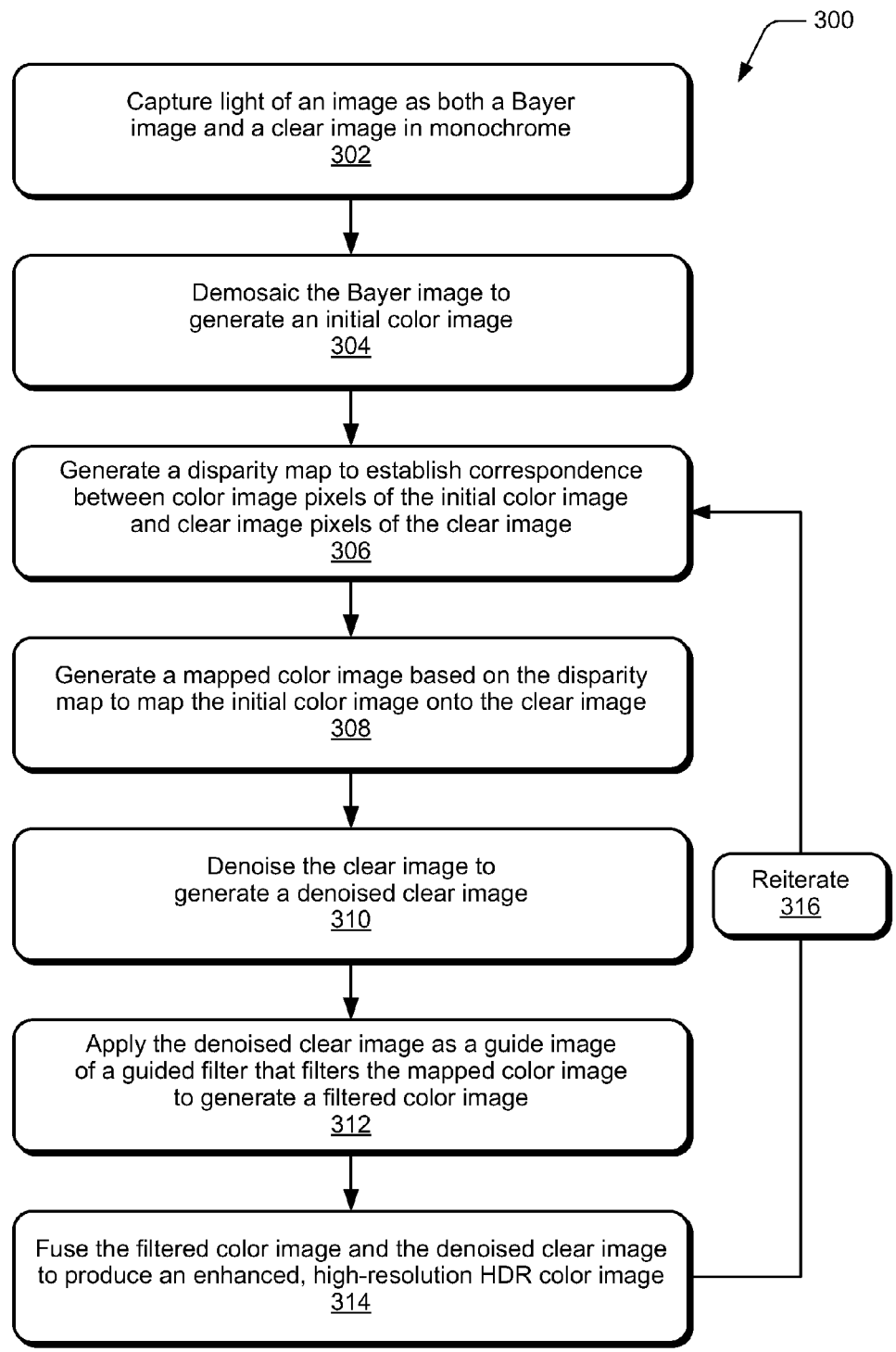
FIG. 3 illustrates an example method of a computational camera using fusion of image sensors in accordance with one or more embodiments.

FIG. 3 illustrates example method(s) 300 of a computational camera using fusion of image sensors. The order in which the method is described is not intended to be construed as a limitation, and any number or combination of the described method operations can be performed in any order to perform a method, or an alternate method.

At 302, the light of an image is captured as both a Bayer image and a clear image in monochrome. For example, the camera device 102 implemented in the portable device 100 (FIG. 1) includes the monochromatic image sensors 104 that capture the light of an image as the clear image 106 in monochrome, and includes the HDR color image sensors 108 that capture the light of the image as the Bayer image 110.

At 304, the Bayer image is demosaiced to generate an initial color image. For example, the portable device 100 implements the image fusion application 116 that includes the demosaicing algorithm 118, which demosaics the Bayer image to generate the initial color image 120.

At 306, a disparity map is generated to establish correspondence between color image pixels of the initial color image and clear image pixels of the clear image. For example, the image fusion application 116 includes the dynamic shifts algorithm 122 that generates the disparity map 126 to establish correspondence between color image pixels of the initial color image 120 and clear image pixels of the clear image 106. The dynamic shifts algorithm 122 also implements the images rectification 124 to rectify the initial color image 120 and the clear image 106 for pixel correction to generate the disparity map.

At 308, a mapped color image is generated based on the disparity map to map the initial color image onto the clear image. For example, the image fusion application 116 includes the mapping algorithm 130 that generates the mapped color image 132 based on the disparity map 126 to map the initial color image 120 onto the clear image 106. In implementations, a pixel correspondence of Bayer color image pixels are mapped to clear channel image pixels to map the color image to the clear image. The mapped color image can be generated as a red, green, blue (RGB) color image from which a filtered color image is generated and used to produce an enhanced, high-resolution HDR color image. Alternatively, the mapped color image can be generated as a luma and chrominance (YUV) components image from which the filtered color image is generated and used to produce the enhanced, high-resolution HDR color image.

At 310, the clear image is denoised to generate a denoised clear image. For example, the image fusion application 116 includes the denoising algorithm 134 that denoises the clear image 106 to generate the denoised clear image 136. At 312, the denoised clear image is applied as a guide image of a guided filter that filters the mapped color image to generate a filtered color image. For example, the image fusion application 116 includes the fusion algorithm 138 that applies the denoised clear image 136 as a guide image of a guided filter 140 that filters the mapped color image 132 to generate the filtered color image 142. The denoised clear image 136 is used as the guide image to construct the guided filter 140, which can then be applied to the RGB color space, or the YUV space of the mapped color image 132, to generate the filtered color image 142.

At 314, the filtered color image and the denoised clear image are fused to produce an enhanced, high-resolution HDR color image. For example, the image fusion application 116 includes the fusion algorithm 138 that implements fusion 144 (also referred to as recombination) to combine the filtered color image 142 and the denoised clear image 136 to produce the enhanced, high-resolution HDR color image 146. The enhanced, high-resolution HDR color image is generated having a high signal-to-noise ratio derived from the denoised clear image. At 316, the image fusion application 116 reiterates to update the disparity map 126 and the mapped color image 132 based on the enhanced, high-resolution HDR color image 146 to map the enhanced, high-resolution HDR color image onto the clear image.

Figure 4:
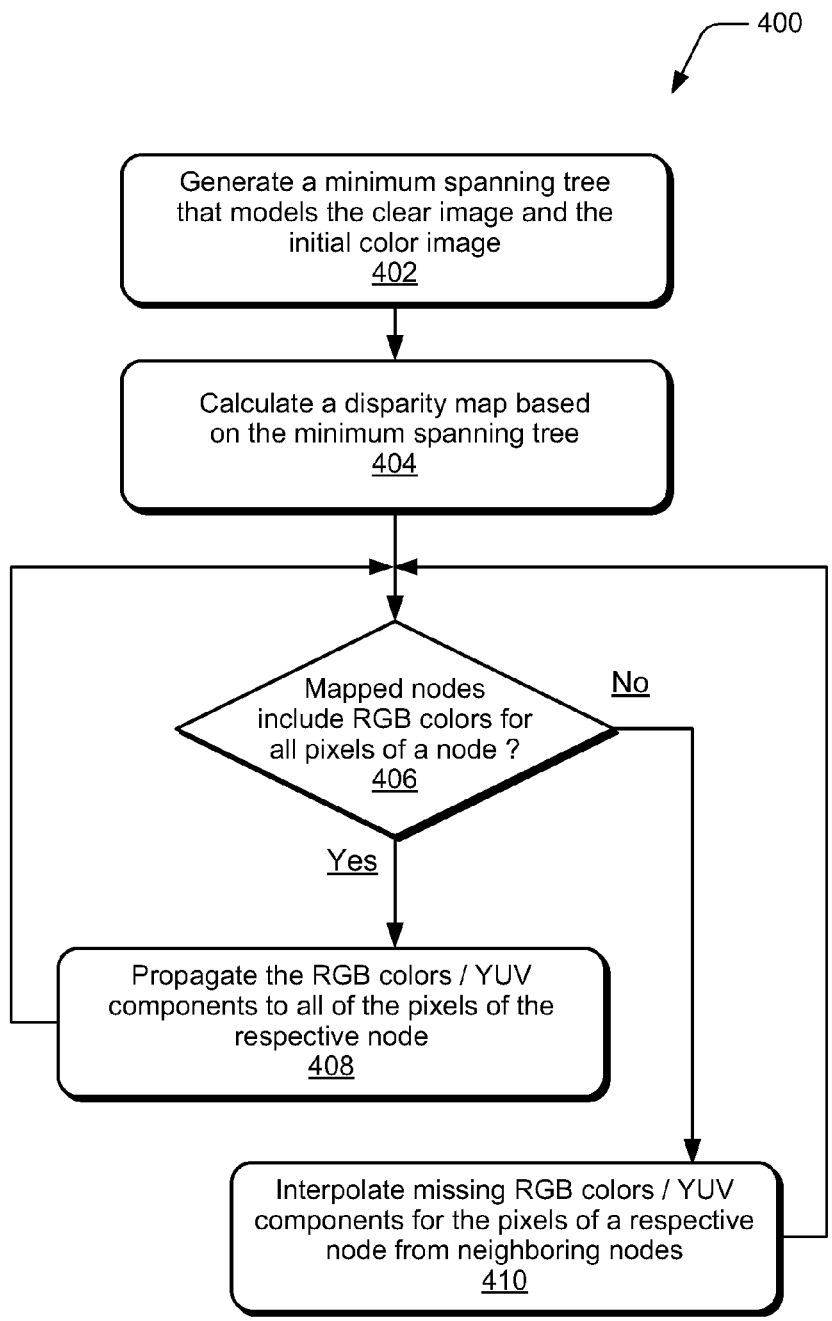
FIG. 4 illustrates another example method of a computational camera using fusion of image sensors in accordance with one or more embodiments.

FIG. 4 illustrates other example method(s) 400 of a computational camera using fusion of image sensors. The order in which the method is described is not intended to be construed as a limitation, and any number or combination of the described method operations can be performed in any order to perform a method, or an alternate method.

At 402, a minimum spanning tree is generated that models the clear image and the initial color image. For example, the portable device 100 (FIG. 1) implements the image fusion application 116 that includes the dynamic shifts algorithm 122, which generates the minimum spanning tree 128 to model the clear image 106 and the initial color image 120, where nodes of the minimum spanning tree represent the pixels of the clear image and the color image.

At 404, a disparity map is calculated based on the minimum spanning tree. For example, the image fusion application 116 includes the dynamic shifts algorithm 122 that calculates the disparity map 126 to establish correspondence between color image pixels of the initial color image 120 and clear image pixels of the clear image 106. In implementations, the disparity map 126 is calculated utilizing the clear channel image pixels (e.g., of the clear image) and a luma component of the initial color image 120 that is generated utilizing the demosaicing algorithm 118 applied to the Bayer image 110.

At 406, a determination is made as to whether mapped nodes of the minimum spanning tree include the RGB colors for all of the pixels of a respective node. For example, the image fusion application 116 determines, for each of the mapped nodes of the minimum spanning tree, whether a mapped node includes the all of the RGB colors for all of the pixels of the node. If a mapped node does include all of the RGB colors for all of the pixels of a respective node (i.e., "Yes" from 406), then at 408, the RGB colors are propagated to all of the pixels of the respective node. For example, the image fusion application 116 propagates the RGB colors to all of the pixels of the respective mapped node. If a mapped node does not include all of the RGB colors for all of the pixels of a respective node (i.e., "No" from 406), then at 410, the missing RGB colors for the pixels of a respective node are interpolated from neighboring nodes. For example, the image fusion application 116 interpolates the missing RGB colors for the pixels of a respective node from neighboring nodes.

Figure 5:
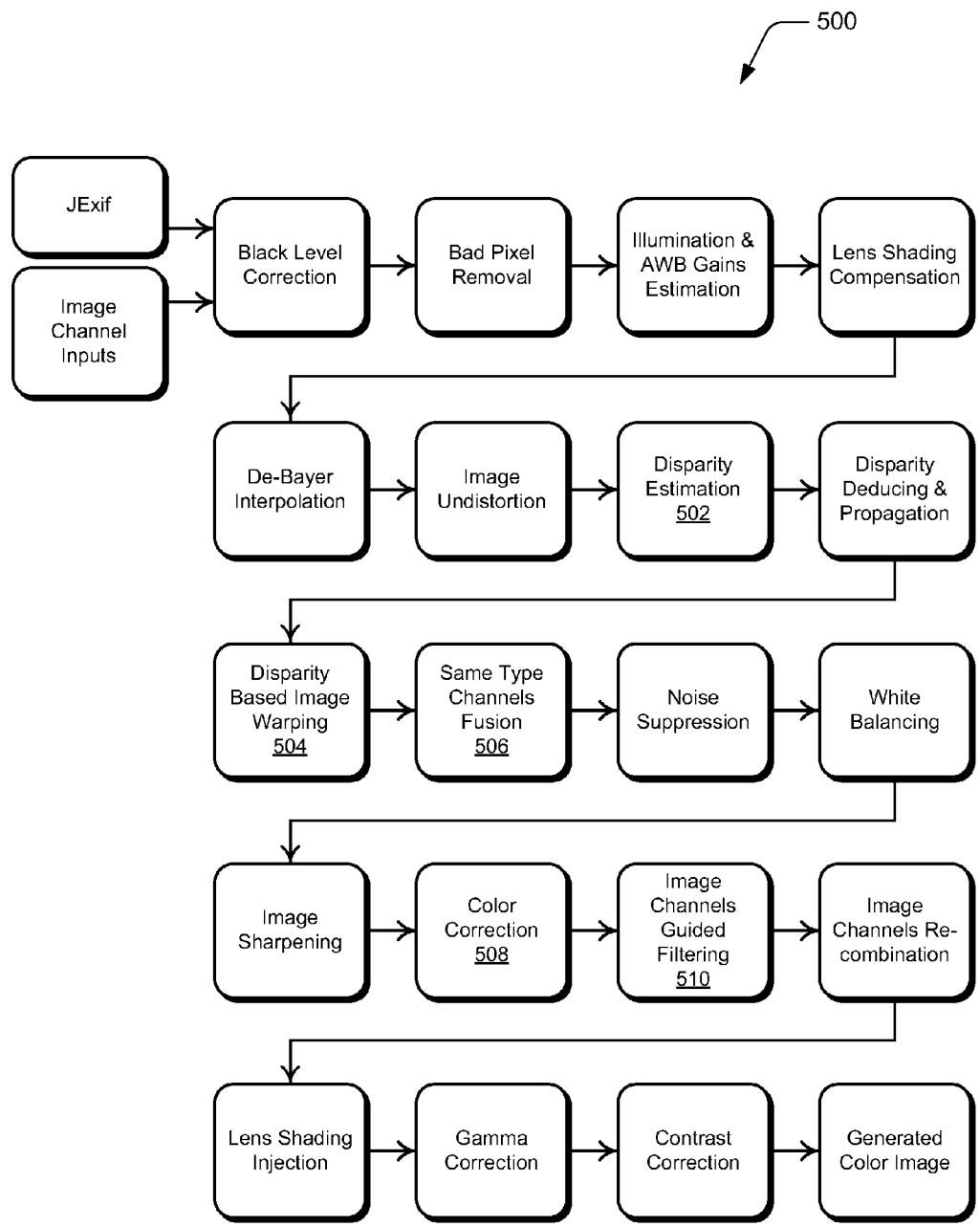
FIG. 5 illustrates an example image processing system of a computational camera using fusion of image sensors in accordance with one or more embodiments.

FIG. 5 illustrates an example image processing system 500 of a computational camera using fusion of image sensors, as described with reference to FIGS. 1-4. The computational camera generates the enhanced, high-resolution HDR color image 146 having resolution in the Y-component that is much higher than would be available from a traditional Bayer camera, and has resolution in the UV colors, or separately in the RGB colors, which are also higher than would be available from a traditional Bayer camera. The processing system 500 (or "pipeline") implements some conventional features that are known for providing high-quality output images, such as with HDR imaging. Additionally, the disparity estimation 502 correlates with the dynamic shifts algorithm 122 of the image fusion application 116 as shown in FIG. 1. The disparity based image warping 504 is utilized to align one image to another, such as the clear image 106 and the initial color image 120, followed by the same type channels fusion 506 to merge more than two sensors captured images. The color correction 508 followed by the image channels guided filtering 510 can be implemented as a bilateral filter for custom denoising of each pixel (or point) in an image, to generate a quality denoised image.

Figure 6:
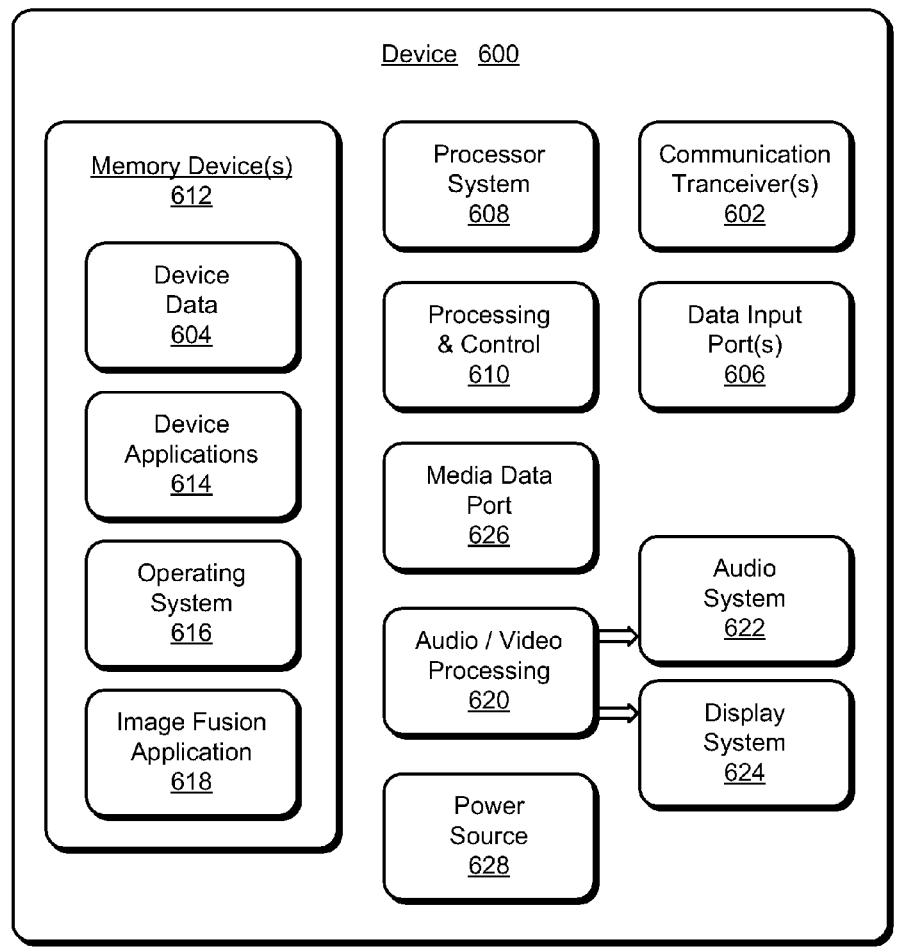
FIG. 6 illustrates various components of an example electronic device that can implement embodiments of a computational camera using fusion of image sensors.

FIG. 6 illustrates various components of an example device 600 that can be implemented as any portable device and/or camera device as described with reference to any of the previous FIGS. 1-5. The device 600 includes communication transceivers 602 that enable wired and/or wireless communication of device data 604, such as the captured images. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular telephony, wireless metropolitan area network (WMAN) radios compliant with various IEEE 802.15 (WiMAX™) standards, and wired local area network (LAN) Ethernet transceivers.

The device 600 may also include one or more data input ports 606 via which any type of data, media content, and/or inputs can be received, such as user-selectable inputs, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to components, peripherals, or accessories such as microphones and/or cameras.

The device 600 includes a processor system 608 of one or more processors (e.g., any of microprocessors, controllers, and the like) and/or a processor and memory system (e.g., implemented in an SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 610. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 also includes one or more memory devices 612 that enable data storage, examples of which include random access memory (RAM), non-volatile memory (e.g., read-only memory (ROM), flash memory, EPROM, EEPROM, etc.), and a disk storage device. A disk storage device may be implemented as any type of magnetic or optical storage device, such as a hard disk drive, a recordable and/or rewriteable disc, any type of a digital versatile disc (DVD), and the like. The device 600 may also include a mass storage media device.

A memory device 612 provides data storage mechanisms to store the device data 604, other types of information and/or data, and various device applications 614 (e.g., software applications). For example, an operating system 616 can be maintained as software instructions with a memory device and executed by the processor system 608. The device applications may also include a device manager, such as any form of a control application, software application, signal-processing and control module, code that is native to a particular device, a hardware abstraction layer for a particular device, and so on. The device may also include an image fusion application 618, such as described with reference to FIGS. 1-5.

The device 600 also includes an audio and/or video processing system 620 that generates audio data for an audio system 622 and/or generates display data for a display system 624. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 626. In implementations, the audio system and/or the display system are integrated components of the example device.

The device 600 can also include a power source 628, such as when the device is implemented as a wearable device (e.g., a glasses device). The power source may include a charging and/or power system, and can be implemented as a flexible strip battery, a rechargeable battery, a charged super-capacitor, and/or any other type of active or passive power source.

Although embodiments of a computational camera using fusion of image sensors have been described in language specific to features and/or methods, the subject of the appended claims is not necessarily limited to the specific features or methods described. Rather, the specific features and methods are disclosed as example implementations of a computational camera using fusion of image sensors.

The invention claimed is:

1. A camera device, comprising:
one or more monochromatic image sensors configured to capture light of an image as a clear image in monochrome;
one or more HDR color image sensors configured to capture the light of the image as a Bayer image;
a processing system to implement image processing algorithms of an image fusion application that is configured to:
demosaic the Bayer image to generate an initial color image;
generate a disparity map to establish correspondence between color image pixels of the initial color image and clear image pixels of the clear image;
generate a mapped color image based on the disparity map to map the initial color image onto the clear image;
denoise the clear image to generate a denoised clear image;
apply the denoised clear image as a guide image of a guided filter that filters the mapped color image to generate a filtered color image; and
fuse the filtered color image and the denoised clear image to produce an enhanced, high-resolution HDR color image.

2. The camera device as recited in claim 1, wherein the image fusion application is configured to reiterate to update the disparity map and the mapped color image based on the enhanced, high-resolution HDR color image to map the enhanced, high-resolution HDR color image onto the clear image.

3. The camera device as recited in claim 2, wherein the image fusion application is configured to utilize the clear image to said demosaic the Bayer image based on the reiterated use of the enhanced, high-resolution HDR color image to said update the disparity map and the mapped color image.

4. The camera device as recited in claim 1, wherein the mapped color image is a red, green, blue (RGB) color image from which the filtered color image is generated from the guided filter and used to produce the enhanced, high-resolution HDR color image.

5. The camera device as recited in claim 1, wherein the mapped color image is a luma and chrominance (YUV) components image from which the filtered color image is generated from the guided filter and used to produce the enhanced, high-resolution HDR color image.

6. The camera device as recited in claim 1, wherein the image fusion application is configured to said generate the enhanced, high-resolution HDR color image having a high signal-to-noise ratio derived from the denoised clear image.

7. The camera device as recited in claim 1, wherein the image fusion application is configured for pixel correction by images rectification of the initial color image and the clear image to said generate the disparity map.

8. The camera device as recited in claim 1, wherein the image fusion application reiterates to said update the disparity map to improve color sampling over the initial color image.

9. The camera device as recited in claim 1, wherein the image fusion application reiterates to update a minimum spanning tree to said map the initial color image onto the clear image.

10. A method, comprising:
capturing light of an image as both a Bayer image and a clear image in monochrome;
demosaicing the Bayer image to generate an initial color image;
generating a disparity map to establish correspondence between color image pixels of the initial color image and clear image pixels of the clear image;
generating a mapped color image based on the disparity map to map the initial color image onto the clear image;
denoising the clear image to generate a denoised clear image;
applying the denoised clear image as a guide image of a guided filter that filters the mapped color image to generate a filtered color image; and
fusing the filtered color image and the denoised clear image to produce an enhanced, high-resolution HDR color image.

11. The method as recited in claim 10, further comprising:
reiterating to update the disparity map and the mapped color image based on the enhanced, high-resolution HDR color image to map the enhanced, high-resolution HDR color image onto the clear image.

12. The method as recited in claim 11, wherein the clear image is utilized to demosaic the Bayer image based on said reiterating use of the enhanced, high-resolution HDR color image to update the disparity map and the mapped color image.

13. The method as recited in claim 10, wherein the mapped color image is a red, green, blue (RGB) color image from which the filtered color image is generated from the guided filter and used to produce the enhanced, high-resolution HDR color image.

14. The method as recited in claim 10, wherein the mapped color image is a luma and chrominance (YUV) components image from which the filtered color image is generated from the guided filter and used to produce the enhanced, high-resolution HDR color image.

15. The method as recited in claim 10, wherein the enhanced, high-resolution HDR color image is generated having a high signal-to-noise ratio derived from the denoised clear image.

16. The method as recited in claim 10, further comprising:
rectifying the initial color image and the clear image for pixel correction to generate the disparity map.

17. The method as recited in claim 10, wherein said reiterating to update the disparity map to improve color sampling over the initial color image, and said updating the mapped color image based on the enhanced, high-resolution HDR color image and a minimum spanning tree to map the initial color image onto the clear image.

18. A portable device, comprising:
a camera device configured to capture light of an image as both a Bayer image and a clear image in monochrome;
one or more computer processors; and
one or more computer-readable storage media having executable instructions thereon that, in response to execution by the one or more computer processors, perform operations comprising:
performing a demosaicing algorithm to generate an initial color image from the Bayer image;
performing a dynamic shifts algorithm to generate a disparity map that establishes correspondence between color image pixels of the initial color image and clear image pixels of the clear image;
performing a mapping algorithm to generate a mapped color image based on the disparity map to map the initial color image onto the clear image;
performing a fusion algorithm to apply a denoised clear image as a guide image of a guided filter that filters the mapped color image to generate a filtered color image, and fuse the filtered color image and the denoised clear image to produce an enhanced, high-resolution HDR color image; and
performing the dynamic shifts algorithm to update the disparity map based on the enhanced, high-resolution HDR color image.

19. The portable device as recited in claim 18, wherein the operations further comprise:
performing the mapping algorithm to reiterate generating the mapped color image to map the enhanced, high-resolution HDR color image onto the clear image; and
performing the demosaicing algorithm to utilize the clear image to demosaic the Bayer image based on the reiterated use of the enhanced, high-resolution HDR color image.

20. The portable device as recited in claim 18, wherein performing the fusion algorithm produces the enhanced, high-resolution HDR color image having a high signal-to-noise ratio derived from the denoised clear image.

* * * * *